Patented July 11, 1933

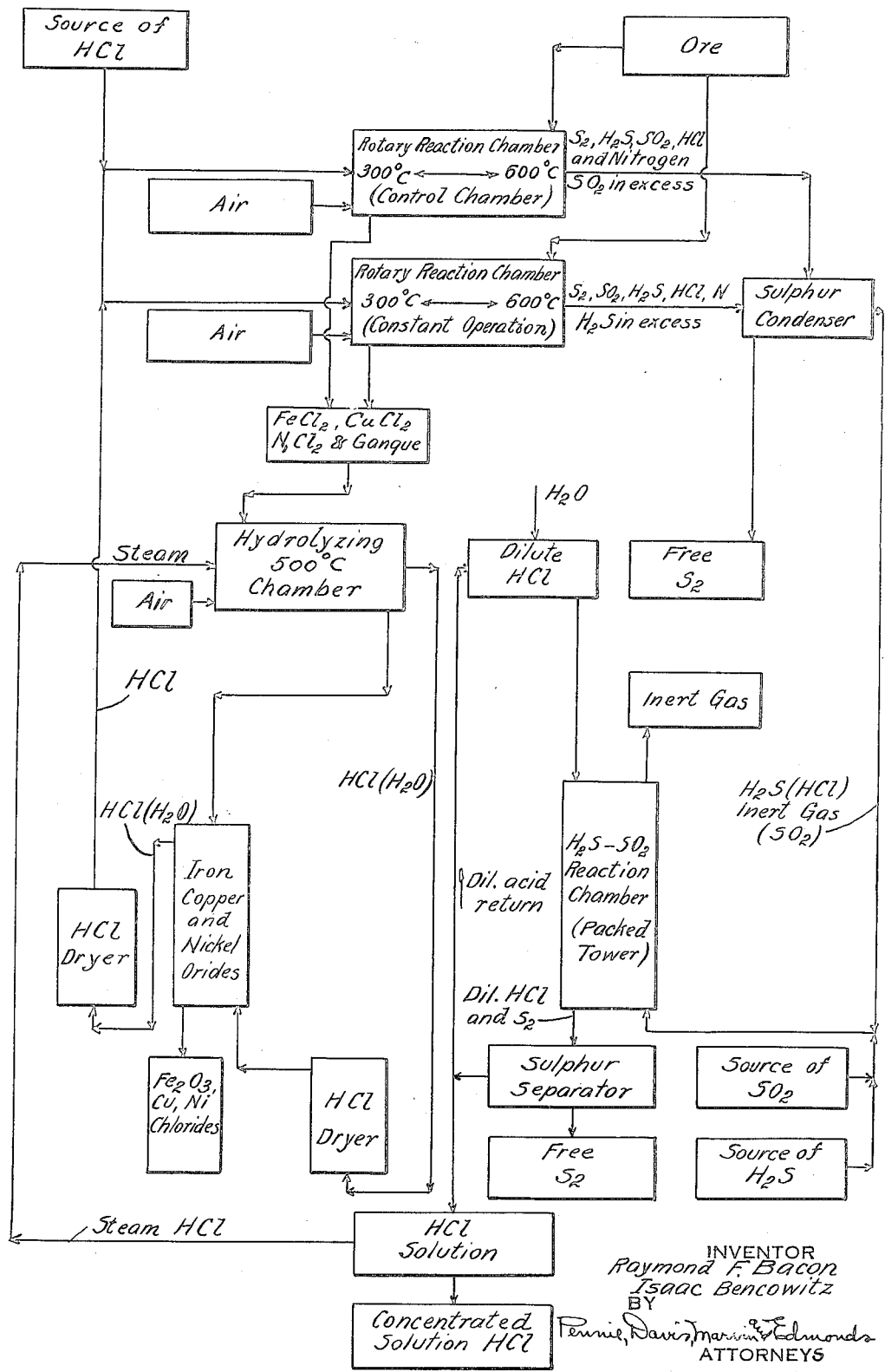

1,917,235

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

Application filed March 6, 1930. Serial No. 433,601.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel, with hydrogen chloride for the purpose of obtaining free sulphur and/or separating iron from the mass of material undergoing treatment.

The present invention is based on our discovery that when pyrites is subjected to the action of hydrogen chloride in the presence of a source of oxygen at an elevated temperature, a mixture of gases comprising sulphur dioxide and hydrogen sulphide may be produced.

When pyrites-bearing material is heated in the presence of hydrogen chloride and free oxygen or a substance capable of providing oxygen for combining with sulphur, hydrogen sulphide and sulphur dioxide are produced. The free oxygen may be provided by means of air. Metal oxides such, for example, as ferric oxide accelerate the reaction and may be mixed with the pyrites to be treated.

When free oxygen and hydrogen chloride are employed, the reactions involved will take place satisfactorily at temperatures as low as 400° C., but the reactions proceed more rapidly at higher temperatures. In such cases, temperatures between 400° C. and about 800° C. may be used advantageously. Ordinarily, a maximum temperature of about 600° C. is entirely satisfactory.

A complete process of the invention involves the treatment of pyrites-bearing material with hydrogen chloride and a suitable oxygen containing substance to produce hydrogen sulphide and sulphur dioxide. The hydrogen sulphide and sulphur dioxide produced are caused to react to liberate elemental sulphur. The hydrogen sulphide and sulphur dioxide are preferably passed in contact with a catalytic agent capable of promoting the desired reaction. The treatment of the pyrites-bearing material is so conducted that ferrous chloride and chlorides of other heavy metals which might be present in the material being treated are produced. The resulting chloride-bearing material is treated to regenerate hydrogen chloride which is returned to the process.

The relative amounts of sulphur dioxide and hydrogen sulphide produced may be controlled by regulating the amounts of hydrogen chloride and oxygen containing substance employed. The process may be so controlled that two molecules of hydrogen sulphide are produced for every molecule of sulphur dioxide produced, or it may be so controlled that any desired relative amounts of the two compounds may be produced and any additional amount of either compound which may be required may be supplied from a separate source.

According to the preferred process of the invention, two or more separate operations for the production of mixtures of sulphur dioxide and hydrogen sulphide are conducted simultaneously, and the resulting gases are combined for the purpose of the operation for producing elemental sulphur. It is difficult to so control a single operation as to produce the theoretical amounts of sulphur dioxide and hydrogen sulphide required for carrying out the reaction for the production of elemental sulphur, but an operation may be readily adjusted to produce mixtures of gases containing fixed proportions of hydrogen sulphide and sulphur dioxide with either in excess. We, therefore, prefer to conduct two or more separate operations to produce different mixtures of gases containing hydrogen sulphide and sulphur dioxide in different proportions but all of which may be combined to produce a mixture containing hydrogen sulphide and sulphur dioxide in proper proportions. This procedure permits all of the operations to be conducted continuously without frequent adjustments, or, if the combined gases show a tendency to vary, one of the operations may be utilized for control purposes.

The invention will be better understood from a consideration of the accompanying flowsheet and the following description of a process for treating ore containing pyrites and sulphides of copper and nickel.

The ore to be treated is introduced in a finely divided condition into the interior of two similar rotary reaction chambers each having ore charging means at one end and discharging means at the other end, and which are so constructed and operated that the ore is gradually moved from the charging ends toward the discharge ends. Hydrogen chloride and air are introduced into the reaction chambers at the ends opposite to those at which the ore is introduced and the ore and hydrogen chloride and air pass through the reaction chambers in counter-current relationship, the hydrogen sulphide and sulphur dioxide produced being removed from the reaction chambers at points near the charging ends.

The ore is preferably ground to provide particles sufficiently small to pass a 100-mesh screen in order that intimate contact of the sulphide particles with the air and hydrogen chloride may be obtained. The presence of a small amount of water in the ore will not produce harmful results.

The reactions involved proceed satisfactorily at a temperature of about 400° C. but they proceed more rapidly and more completely at a temperature of about 550° C. to 600° C. It is, therefore, advisable to maintain a temperature of about 550° C. to 600° C. in at least a portion of each reaction chamber. Such a temperature may be maintained in the charging end portions of the reaction chambers to insure the passage of all issuing gases through zones in which conditions are conductive to a complete reaction.

The process is preferably so controlled that a temperature of about 550° C. to 600° C. is maintained near the charging ends of the reaction chambers and a temperature of about 300° C. to 400° C. is maintained near the discharge end portions of the reaction chambers.

The hydrogen chloride and air are introduced into portions of the reaction chambers which are maintained at a temperature of about 300° C. to 400° C. The hydrogen chloride, air and metal sulphides react to produce sulphur dioxide, hydrogen sulphide, ferrous chloride and the chlorides of copper and nickel. The chlorides produced and the gangue materials of the original ore are discharged continuously in the form of a solid residue. Small amounts of hydrogen sulphide and sulphur dioxide react within the reaction chambers to produce elemental sulphur which is vaporized. The gases issuing from the reaction chambers are mixtures comprising hydrogen sulphide, sulphur dioxide, sulphur vapor, nitrogen and small amounts of hydrogen chloride.

One of the reaction chambers is preferably operated under constant conditions with respect to temperature and amounts of ore and reagents introduced. The other reaction chamber is preferably utilized for control purposes and operated under variable controlled conditions. The variable operation is so conducted that the gases from the two chambers may be combined to provide hydrogen sulphide and sulphur dioxide in proper proportions for carrying out a reaction for producing elemental sulphur according to the following equation:

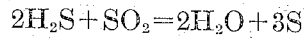

$$2H_2S + SO_2 = 2H_2O + 3S$$

The mixture of gases is cooled to condense the sulphur vapor contained therein, and the remaining gases are passed in contact with water. For bringing the gases into contact with water the gases and water may be passed in counter-current relationship through a packed tower. The hydrogen chloride contained in the gases is dissolved in the water to form a dilute solution of hydrochloric acid which promotes a reaction between the hydrogen sulphide and the sulphur dioxide. Elemental sulphur is formed and it may be separated from the hydrochloric acid solution in any suitable manner, as, for example, by settling and decantation or filtering.

It is desirable to form or otherwise provide a solution of hydrochloric acid in the water tower through which the gases containing hydrogen chloride and sulphur dioxide are passed. An acid such as hydrochloric acid reduces any tendency toward the formation of polythionates, and assists in precipitation of the elemental sulphur produced by preventing the production of colloidal sulphur. The hydrochloric acid solution produced may be circulated through the packed tower, a portion being withdrawn and water being added constantly to maintain the proper concentration.

The hot residue containing ferrous chloride and the chlorides of nickel and copper is treated with steam and air in order to produce hydrogen chloride and oxides of the metals by hydrolysis. Air is admitted with steam in order to assist the reaction by oxidation of the ferrous chloride to ferric chloride. The air and steam are preferably preheated in order to assist in maintaining the mass at the desired reaction temperature.

The hydrolysis will take place at normal atmospheric temperatures, but the rate of reaction is too slow for practical purposes. Higher temperatures not only increase the speed of the hydrolysis but also assist in the air oxidation which takes place. The treatment of the ferrous chloride-bearing material with air and steam may be carried out satisfactorily at a temperature of from 440° C. to 600° C. Ordinarily, a reaction temperature of about 500° C. is entirely satisfactory.

The treatment of the ferrous chloride-bearing material with air and steam may be carried out conveniently in a rotary reaction chamber having charging means at one end and discharging means at the opposite end and which is so constructed and arranged that the material passes from the charging end to the discharge end during its rotation. The ferrous chloride-bearing material and the air and steam are introduced into the reaction chamber at the charging end and the resulting heavy metal oxides and hydrogen chloride are removed from the reaction chamber at the discharge end. The oxides and hydrogen chloride are preferably moved through separate discharge outlets. If the hydrogen chloride gas leaving the chamber carries considerable amounts of entrained particles of oxides it may be desirable to provide a settling chamber into which the oxides and hydrogen chloride may be introduced from the reaction chamber. Such a chamber should be maintained at a sufficiently high temperature to prevent the reverse reaction.

Means such, for example, as porcelain balls or other large pieces of inert materials are provided within the reaction chamber to prevent the chlorides from adhering to the walls of the chamber. Such means aid in stirring and grinding the chlorides and oxides as they pass through the reaction chamber.

The gases issuing from the reaction chamber contain hydrogen chloride and water vapor and they are passed through a suitable drying apparatus such, for example, as a packed tower having sulphuric acid trickling therethrough to separate the water vapor and produce dry hydrogen chloride.

The treatment of the chloride-bearing material with steam and air results in the production of oxides of iron, copper and nickel which are discharged continuously from the reaction chamber. The dry hydrogen chloride is passed in contact with the oxides produced to convert the oxides of copper and nickel into chlorides. A portion of the regenerated hydrogen chloride is thus consumed and the remainder is dried and utilized for treating additional quantities of ore.

The mixture of ferric oxide and chlorides of copper and nickel may be leached with water to produce a solution of the chlorides from which copper and nickel may be recovered in any suitable manner.

The dilute hydrochloric acid solution produced by passing the gases resulting from the treatment of the ore through water may be concentrated by heating, after the separation of the sulphur, and the steam produced may be utilized for treating the chloride-bearing material.

As a result of the treatment of the ore and ferrous chloride-bearing material with air, considerable quantities of inert gases such as nitrogen are introduced into the system and must be eliminated in order to avoid excessive dilution. These gases are eliminated when the gases containing hydrogen sulphide and sulphur dioxide are passed in contact with water to produce elemental sulphur.

The complete process may be conducted continuously. A fresh source of hydrogen chloride must be provided to compensate for losses due to leakage and the production of nickel and copper chlorides.

We claim:
1. The method of treating pyrites-bearing material which comprises subjecting the material to the joint actions of hydrogen chloride to form ferrous chloride and hydrogen sulphide, and an oxidizing agent which will react with the sulphur to form sulphur dioxide reacting the hydrogen sulphide and sulphur dioxide to produce elemental sulphur, treating the ferrous chloride to regenerate hydrogen chloride, and returning the regenerated hydrogen chloride to the process.

2. The method of treating pyrites-bearing material which comprises subjecting the material to the action of hydrogen chloride in the presence of a source of oxygen to produce ferrous chloride and hydrogen sulphide by the action of the hydrogen chloride and sulphur dioxide by the action of the oxygen, reacting the hydrogen sulphide and sulphur dioxide to produce elemental sulphur, treating the ferrous chloride to regenerate hydrogen chloride, and returning the regenerated hydrogen chloride to the process.

3. The method of treating pyrites-bearing material which comprises subjecting the material to the action of hydrogen chloride and air at an elevated temperature to produce ferrous chloride, hydrogen sulphide and sulphur dioxide, reacting the hydrogen sulphide and sulphur dioxide to produce elemental sulphur, treating the ferrous chloride to regenerate hydrogen chloride, and returning the regenerated hydrogen chloride to the process.

4. The method of treating pyrites-bearing material which comprises subjecting the material to the action of hydrogen chloride in the presence of ferric oxide to produce ferrous chloride and to form volatilized compounds of the sulphur, treating the ferrous chloride to regenerate hydrogen chloride, and returning the regenerated hydrogen chloride to the process.

5. The method of treating pyrites-bearing material which comprises subjecting the material to the action of hydrogen chloride in the presence of an agent which reacts with the sulphur to form one or more volatile sulphur compounds whereby ferrous chloride and one or more volatile sulphur compounds are produced respectively by the action of said hydrogen chloride and said agent, subjecting the ferrous chloride to the action of steam and air to regenerate hydrogen chloride, and returning the regenerated hydrogen chloride to the process.

6. The method of treating ore containing pyrites and copper sulphide which comprises subjecting the ore to the joint actions of hydrogen chloride to form ferrous chloride, copper chloride and hydrogen sulphide, and an oxidizing agent which will react with the sulphur to form sulphur dioxide, treating the chlorides of iron and copper to regenerate hydrogen chloride and produce oxides of iron and copper, utilizing a portion of the regenerated hydrogen chloride to convert the copper oxide to copper chloride, and utilizing the remainder of the regenerated hydrogen chloride to treat additional ore.

7. The method of treating ore containing pyrites and copper sulphide which comprises treating the material to form chlorides of iron and copper, hydrolyzing the chlorides of iron and copper at an elevated temperature to produce hydrogen chloride and oxides of iron and copper, utilizing a portion of the hydrogen chloride produced to convert the copper oxide to copper chloride and leaching the mixture of copper chloride and iron oxide with water to extract the copper chloride.

8. The method of treating ore containing pyrites and sulphides of copper and nickel which comprises subjecting the ore to the joint actions of hydrogen chloride to form ferrous chloride, copper chloride, nickel chloride and hydrogen sulphide, and an oxidizing agent which will react with the sulphur to form sulphur dioxide, treating the chlorides of iron, copper and nickel to regenerate hydrogen chloride and produce oxides of iron, copper and nickel, utilizing a portion of the regenerated hydrogen chloride to convert the copper and nickel oxides to copper and nickel chlorides, leaching the mixture of copper and nickel chlorides and iron oxide with water to extract said chlorides, and utilizing the remainder of the regenerated hydrogen chloride to treat additional ore.

In testimony whereof we affix our signatures.

RAYMOND F. BACON.
ISAAC BENCOWITZ.